(12) United States Patent
Zhu

(10) Patent No.: US 7,734,907 B2
(45) Date of Patent: Jun. 8, 2010

(54) METHODS AND SYSTEMS FOR REDIRECTING DATA

(75) Inventor: Tong Zhu, Marlboro, MA (US)

(73) Assignee: Symantec Corporation, Cupertino, CA (US)

( * ) Notice: Subject to any disclaimer, the term of this patent is extended or adjusted under 35 U.S.C. 154(b) by 1062 days.

(21) Appl. No.: 10/730,222

(22) Filed: Dec. 8, 2003

(65) Prior Publication Data
US 2005/0125542 A1 Jun. 9, 2005

(51) Int. Cl.
*H04L 9/00* (2006.01)
(52) U.S. Cl. ............... 713/153; 709/227; 709/221; 709/239; 726/12
(58) Field of Classification Search ............... 713/153; 709/227, 221; 726/12
See application file for complete search history.

(56) References Cited
U.S. PATENT DOCUMENTS

| | | | |
|---|---|---|---|
| 6,751,190 B1 * | 6/2004 | Swallow | 370/217 |
| 6,986,061 B1 * | 1/2006 | Kunzinger | 709/225 |
| 7,000,121 B2 * | 2/2006 | Jarosz | 726/15 |
| 7,188,280 B2 * | 3/2007 | Shinomiya et al. | 714/43 |
| 7,274,656 B2 * | 9/2007 | Lee et al. | 370/223 |
| 2002/0163686 A1 * | 11/2002 | Bischoff et al. | 359/110 |
| 2004/0064563 A1 * | 4/2004 | Kauhanen et al. | 709/227 |

\* cited by examiner

*Primary Examiner*—Nasser Moazzami
*Assistant Examiner*—Fikremariam Yalew
(74) *Attorney, Agent, or Firm*—Finnegan, Henderson, Farabow, Garrett & Dunner, LLP.

(57) ABSTRACT

Systems and methods are disclosed for redirecting data. These systems and methods may include transmitting over a network an indication from a first node to a second node that a third node has failed. In addition, a first data may be reconfigured to be transmitted over the network between a fourth node and the first node after the indication has been received by the second node. The first data may be initially configured to be transmitted over the network between the second node and the third node. Furthermore, the disclosed systems and methods may include configuring the first node and the fourth node to send and receive the reconfigured first data as encrypted data via a first tunnel and configuring the second node and the third node to send and receive the first data as encrypted data via a second tunnel.

15 Claims, 3 Drawing Sheets

METHODS AND SYSTEMS FOR REDIRECTING DATA

BACKGROUND OF THE INVENTION

I. Field of the Invention

The present invention relates to redirecting data. More particularly, the present invention relates to redirecting data within a data communications network.

II. Background Information

Many virtual networks rely on a process known as "tunneling" to create a private network within a network. Essentially, tunneling places an entire data packet within another packet and sends the latter over the network. The outer packet's protocol is understood by the network and at least two gateways on the network, called tunnel interfaces, where the packet enters and exits the network. With tunneling, for example, a packet that uses a protocol not supported on the Internet may be placed inside an IP packet and sent securely over the Internet. Or a packet that uses a private (non-routable) IP address may be placed inside a packet that uses a globally unique IP address to extend a private network over the Internet.

Tunneling may utilize several different protocols, for example, carrier protocol, encapsulating protocol, and passenger protocol. Carrier protocol is the protocol used by the network that the information travels over, for example, TCP or TCP/IP when the network in the Internet. Encapsulating protocol is the protocol, such as generic routing encapsulation (GRE) or IP Security (IPSec), that wraps around the original data. And Passenger protocol may comprise the original data's protocol such as IPX, NetBeui, or IP.

In a site-to-site private network, GRE may comprise the encapsulating protocol that provides the framework for packaging the passenger protocol for transport over the carrier protocol, which is typically IP-based. This includes information on what type of packet is encapsulated and information about the connection between the client and server. Rather than GRE, IPSec may be used as the encapsulating protocol. IPSec works well on both remote-access and site-to-site VPNs. IPSec should be supported at both tunnel gateways.

Conventional tunneling methods include multiple parallel tunnels between two gateways. For example, one tunnel may be established between a first node of a first gateway and a first node of a second gateway. A second tunnel may be established between a second node of a first gateway and a second node of a second gateway. In conventional systems, if any node at either gateway fails, the corresponding tunnel also fails. This may be problematic because the data being routed to and communicated over the failed tunnel has no secure path between the gateways.

In view of the foregoing, there is a need for a method and system for redirecting data over a network. Furthermore, there is a need for redirecting data over a network when one secured path over the network fails.

SUMMARY OF THE INVENTION

Consistent with embodiments of the present invention, systems and methods are disclosed for redirecting data that avoid the problems associated with prior data redirecting methods and systems as discussed herein above.

In accordance with one embodiment, a method for redirecting data comprises transmitting over a network an indication from a first node to a second node that a third node has failed and reconfiguring a first data, the first data initially configured to be transmitted over the network between the second node and the third node, to be transmitted over the network between a fourth node and the first node after the indication has been received by the second node.

According to another embodiment, a system for redirecting data comprises a component for transmitting over a network an indication from a first node to a second node that a third node has failed and a component for reconfiguring a first data, the first data initially configured to be transmitted over the network between the second node and the third node, to be transmitted over the network between a fourth node and the first node after the indication has been received by the second node.

In accordance with yet another embodiment, a computer-readable medium on which is stored a set of instructions for redirecting data, which when executed perform stages comprising transmitting over a network an indication from a first node to a second node that a third node has failed and reconfiguring a first data, the first data initially configured to be transmitted over the network between the second node and the third node, to be transmitted over the network between a fourth node and the first node after the indication has been received by the second node.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
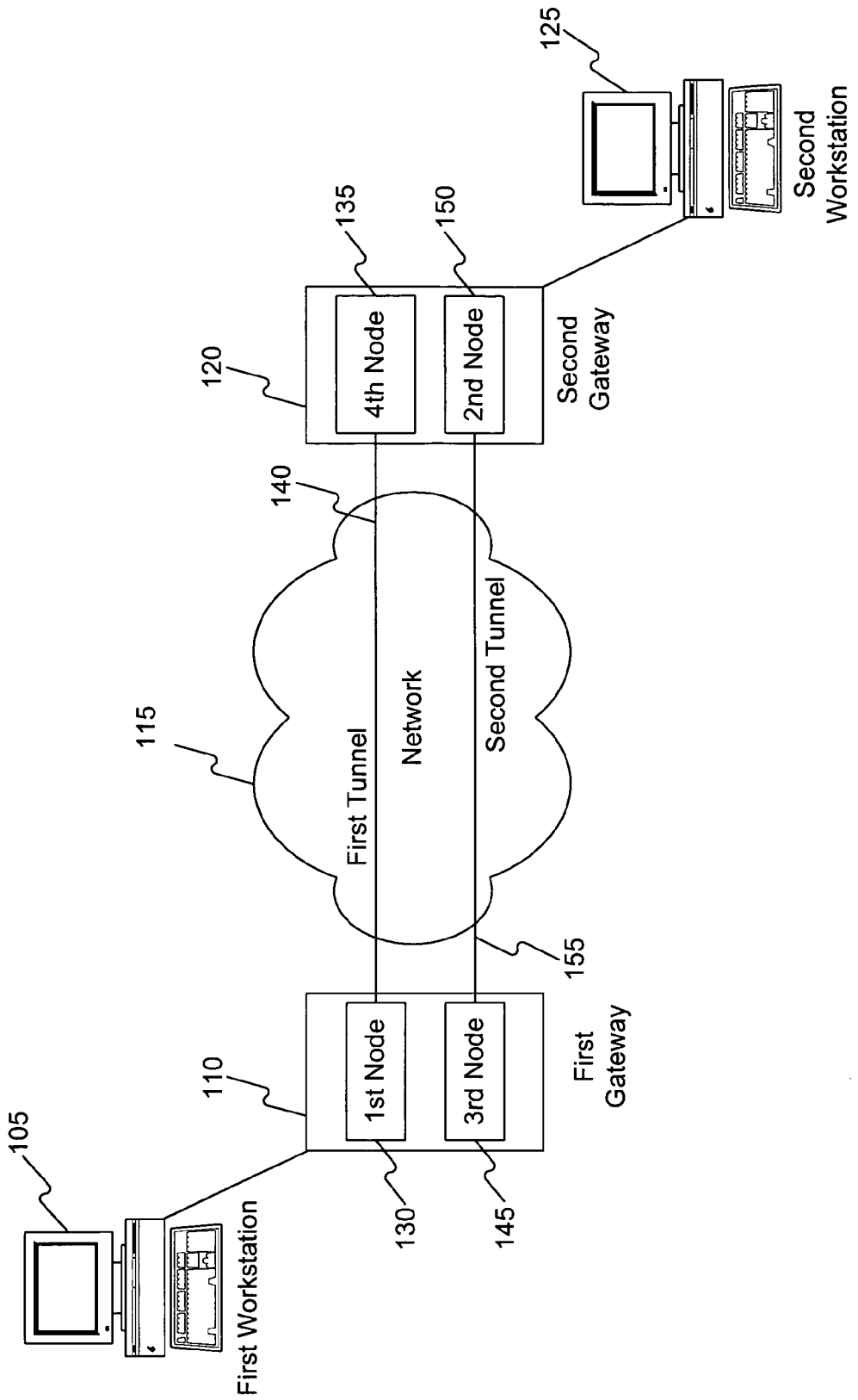
FIG. 1 is a functional block diagram of an exemplary data system consistent with an embodiment of the present invention.

The following detailed description refers to the accompanying drawings. Wherever possible, the same reference numbers are used in the drawings and the following description to refer to the same or similar parts. While several-exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

As herein embodied and illustrated in FIG. 1, a data system 100 may comprise a first workstation 105, a first gateway 110, a network 115, a second gateway 120, and a second workstation 125. First gateway 110 may include a first node 130 and a third node 145. Second gateway may include a fourth node 135 and a second node 150. This shows an exemplary way in which the first node 130 is associated with the third node 145 and the fourth node 135 is associated with the second node 150.

First node 130 and fourth node 135 may be configured to communicate through network 115 over a first tunnel 140. Similarly, third node 145 and second node 150 may be configured to communicate through network 115 over a second tunnel 155. Consistent with the invention, if one node fails, data normally sent over the tunnel corresponding to the failed node may be redirected to a remaining non-failed tunnel. As a result, higher network availability and load balancing may be achieved.

As shown in FIG. 1, workstation 105 and workstation 125 may be operated by the same enterprise, but at different locations. For example, workstation 105 may be operated by an employee of the enterprise working at a home office and workstation 125 may be operated by an employee at a central location of the enterprise. In this case, network 115 may comprise the Internet. In communicating with workstation 125, workstation 105 may send data to gateway 110. First node 130 may encrypt the data and send it to fourth node 135 of gateway 120 via first tunnel 140. Gateway 120 may decrypt and send the data to workstation 125. In system 100, the addresses of work station 105 and workstation 125 and the data sent may be secured as the data passes through network 115. The only information associated with the data that is seeable by other network 115 users may be the addresses of first gateway 110 and second gateway 120 due to, for example, the security protocol used in conjunction with first tunnel 140.

Generally, a security protocol is a communications protocol that encrypts and decrypts a message for online transmission and provides authentication. IPSec, as referred to above, is a security protocol that provides authentication and encryption over the Internet, for example. Unlike other security protocols, which provide services at layer 4 of the network and secures two applications, IPsec works at layer 3 and secures everything in the network. In networking, layer 3 contains the communications protocol that includes the logical address of a client or server station. It is called the "network layer" and contains the address (IP, IPX, etc.) inspected by a router that forwards the data through the network. Layer 3 contains a type field so that traffic can be prioritized and forwarded based on message type as well as network destination. IPsec also includes internet key exchange (IKE). IKE is a process for establishing a security association (SA) that authenticates users, negotiates the encryption method, and exchanges a secret key. IKE uses public key cryptography to generate the secret key for both parties so that the encrypted data may be decrypted at the other end.

Figure 2:
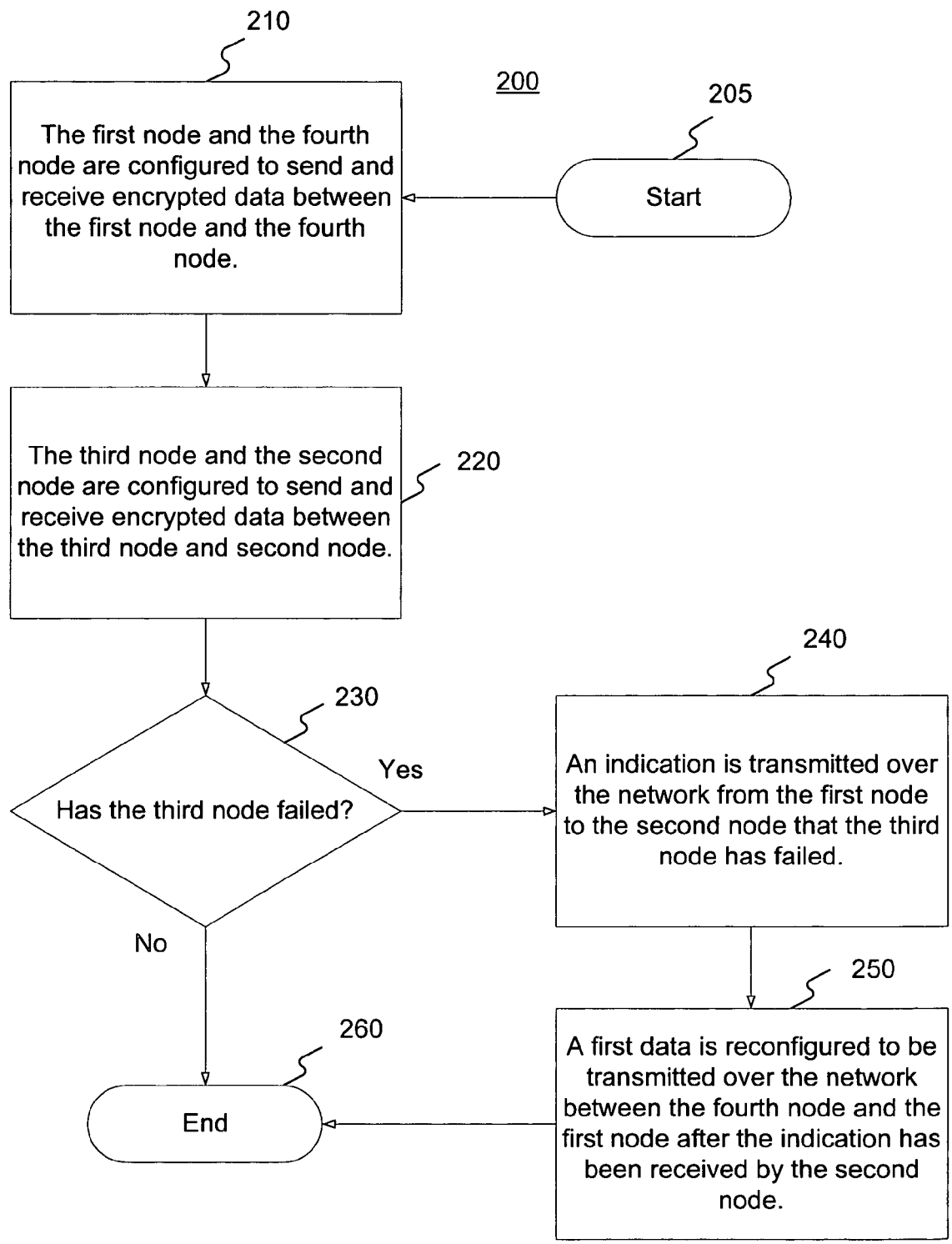
FIG. 2 is a flow chart of an exemplary method for redirecting data consistent with an embodiment of the present invention.

FIG. 2 is a flow chart setting forth the general stages involved in exemplary method 200 for redirecting data. The implementation of the stages of exemplary method 200 in accordance with an exemplary embodiment of the present invention will be described in greater detail below. Exemplary method 200 begins at starting block 205 and proceeds to stage 210 where first node 130 and fourth node 135 are configured to send and receive encrypted data between first node 130 and fourth node 135. For example, in communicating with workstation 125, workstation 105 may send data to gateway 110. First node 130 may encrypt the data and send it to fourth node 135 of gateway 120 via first tunnel 140. Gateway 120 may decrypt and send the data to workstation 125. In system 100, the addresses of workstation 105 and workstation 125 and the data sent may be secured as the data passes through network 115 using first tunnel 140. The only information associated with the data available to be seen by other network 115 users may be the addresses of first gateway 110 and second gateway 120 due to, for example, the security protocol used in conjunction with first tunnel 140.

From stage 210 where first node 130 and fourth node 135 are configured to send and receive encrypted data between first node 130 and fourth node 135, exemplary method 200 continues to stage 220 where third node 145 and second node 150 are configured to send and receive encrypted data between third node 145 and second node 150. For example, in communicating with workstation 125, workstation 105 may send data to gateway 110. Third node 145 may encrypt the data and send it to second node 150 of gateway 120 via second tunnel 155. Gateway 120 may decrypt and send the data to workstation 125. As with first tunnel 140, the addresses of work station 105 and workstation 125 and the data sent may be secured as the data passes through network 115 using second tunnel 155.

After third node 145 and second node 150 are configured to send and receive encrypted data between third node 145 and second node 150 in stage 220, exemplary method 200 advances to decision block 230 where it is determined if third node 145 has failed. For example, first gateway 110 may comprise first node 130 and third node 145 in a cluster configuration. In this way, first gateway may be built with a plurality of smaller and less expensive computers rather than one larger more expensive computer. However, one node within the cluster may fail due to a hardware problem, software problem, power failure, or other failure mechanism. In this configuration, the tunnel utilizing the fail node may also fail. For example, if third node 145 fails, second tunnel 155 may also fail.

From decision block 230, if it is determined that third node 145 has failed, exemplary method 200 proceeds to stage 240 where an indication is transmitted over network 115 from first node 130 to second node 150 that third node 145 has failed. For example, first node 130, being in the same cluster, may be configured to detect or sense when third node 145 has failed. In this case, first node 130 may send a message to the other end of second tunnel 155, i.e., second node 150, that third node 145 has failed. The indication may be sent securely using IKE, as describe above.

Once an indication is transmitted over network 115 from first node 130 to second node 150 that third node 145 has failed in stage 250, exemplary method 200 continues to stage 250 where a first data is reconfigured to be transmitted over network 115 between fourth node 135 and first node 130 after the indication has been received by second node 150. The first data may have been initially configured to be transmitted over network 115 between second node 150 and third node 145. For example, because third node 145 has failed, second tunnel 155 may no longer be used. Accordingly, data configured to be transmitted over network 115 between second node 150 and third node 145 using second tunnel 155 may no longer make it to first gateway 110. Because second node 150 received the indication that third node 145 has failed, the data that second node 150 would normally send using second tunnel 155 may be reconfigured. Specifically, the data (such as the first data in the above example) may be reconfigured to be sent from fourth node 135 to first node 130 using first tunnel 140. In this way, the data may make it to the desired destination, i.e., first gateway 110, in a secured manner.

If at decision block 230, however, it was determined that third node 145 has not failed, or from stage 250 where the first data is reconfigured to be transmitted over network 115 between fourth node 135 and first node 130 after the indication has been received by second node 150, exemplary method 200 ends at stage 260.

Consistent with an embodiment of the present invention a system for redirecting data may comprise a component for transmitting over a network an indication from a first node to a second node that a third node has failed and a component for reconfiguring a first data, the first data initially configured to be transmitted over the network between the second node and the third node, to be transmitted over the network between a fourth node and the first node after the indication has been received by the second node. Consistent with an embodiment of the present invention and referring to FIG. 1, the aforementioned components may be included in data system 100 and may be located, for example, within any workstation, node, or gateway within system 100 such as a computer system 300 as described below with respect to FIG. 3. The aforementioned workstations, nodes, and gateways are exemplary and others may comprise the aforementioned components and still be consistent with embodiments of the present invention.

Any of the aforementioned nodes and workstations may comprise a personal computer or other similar microcomputer-based workstation. It can be appreciated, however, that any of the aforementioned nodes and workstations may comprise any type of computer operating environment such as hand-held devices, multiprocessor systems, microprocessor-based or programmable sender electronics, minicomputers, mainframe computers, and the like. The aforementioned nodes and workstations may also be practiced in distributed computing environments where tasks are performed by remote processing devices. Furthermore, the aforementioned nodes and workstations may comprise a mobile terminal such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and any of the aforementioned nodes and workstations may comprise other systems or devices.

A PDA is a handheld computer that serves as an organizer for personal information. It generally includes at least a name and address database, to-do list and note taker. PDAs are typically pen-based and use a stylus ("pen") to tap selections on menus and to enter printed characters. The unit may also include a small on-screen keyboard which is tapped with the pen. Data may be synchronized between the PDA and a desktop computer through a cable or wireless transmissions.

WAP is a standard for providing cellular phones, pagers and other handheld devices with secure access to e-mail and text-based Web pages. It provides a complete environment for wireless applications that includes a wireless counterpart of TCP/IP and a framework for telephony integration such as call control and phone book access. Wireless Markup Language (WML), which is a streamlined version of HTML for small screen displays, is featured in WAP. WAP uses WMLScript, a compact language that runs in limited memory, and supports handheld input methods such as keypads and voice recognition. In addition, WAP is independent of the air interface and runs over all the major wireless networks. Moreover, it is also device independent, requiring only a minimum functionality in the unit so that it can be used with many different phones and handheld devices.

The aforementioned nodes and workstations may be located in a home, an office, a retail store, a retail center, a commercial center, a retail center kiosk, or any location wherein it may be operated. Moreover, the aforementioned nodes and workstations may be operated by a subject, a data system operator, an employee of the enterprise, or any other person or machine input. It can be appreciated that the aforementioned nodes and workstations may be located at a variety of places and operated by a variety of people.

Network 115 may comprise, for example, a local area network (LAN) or a wide area network (WAN). Such networking environments are commonplace in offices, enterprise-wide computer networks, intranets, and the Internet, and are known by those skilled in the art. When a LAN is used as network 115, the aforementioned nodes and workstations may be connected to network 115 through a network interface located at the aforementioned nodes and workstations. When a WAN networking environment is utilized as network 115, the aforementioned nodes and workstations typically include an internal or external modem (not shown) or other means for establishing communications over the WAN, such as the Internet.

In addition to utilizing a wire line communications system as network 115, a wireless communications system, or a combination of wire line and wireless may be utilized as network 115 in order to, for example, exchange web pages via the internet, exchange e-mails via the Internet, or for utilizing other communications channels. Wireless can be defined as radio transmission via the airwaves, however, various other communication techniques can be used to provide wireless transmission including infrared line of sight, cellular, microwave, satellite, packet radio, and spread spectrum radio. The aforementioned nodes and workstations in the wireless environment can be any mobile terminal such as a cellular phone, personal digital assistant (PDA), intelligent pager, portable computer, hand held computer, or any device capable of receiving wireless data. Wireless data may include, but is not limited to, paging, text messaging, e-mail, Internet access and other specialized data applications specifically excluding or including voice transmission.

In system 100, data may be transmitted by methods and processes other than, or in combination with network 115.

Figure 3:
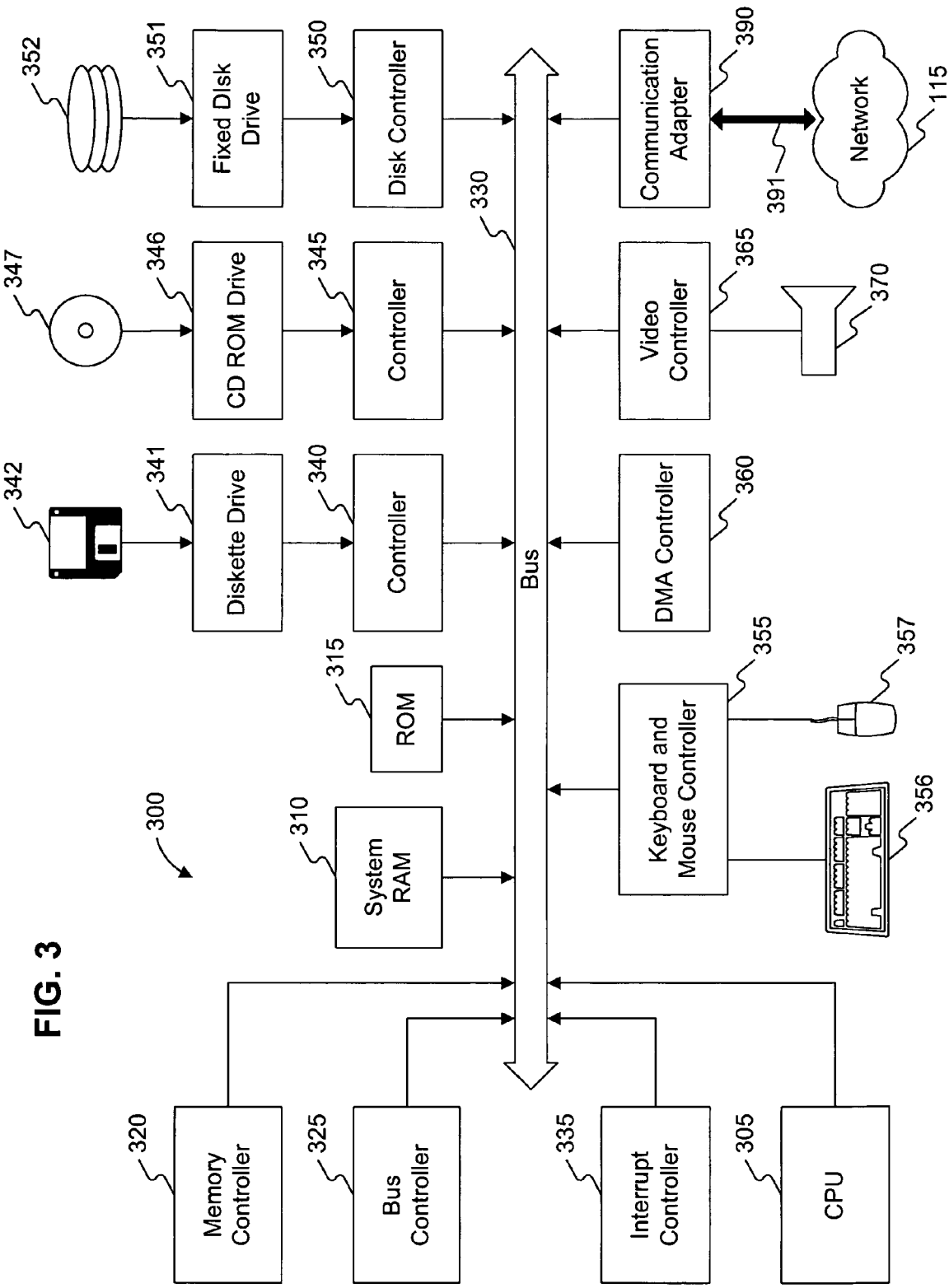
FIG. 3 is a functional block diagram of an exemplary computer consistent with an embodiment of the present invention.

As herein embodied and illustrated in FIG. 3 is a diagram of a system architecture for computer system 300 with which the invention may be implemented. Consistent with an exemplary embodiment of the present invention, an aforementioned node, server, or component may comprise, be disposed, or implemented within computer system 300. Although the description may refer to terms commonly used in describing particular computer systems, such as a personal computer, the description and concepts equally apply to other computer systems, such as network computers, workstations, and even mainframe computers having architectures dissimilar to FIG. 3.

Computer system 300 includes a central processing unit (CPU) 305, which may be implemented with a conventional microprocessor, a random access memory (RAM) 310 for temporary storage of information, and a read only memory (ROM) 315 for permanent storage of information. A memory controller 320 controls the RAM 310.

A bus 330 interconnects the components of computer system 300. A bus controller 325 controls the bus 330. An interrupt controller 335 receives and processes various interrupt signals from the system components.

Mass storage may be provided by diskette 342, CD ROM 347, or hard drive 352. Data and software may be exchanged with computer system 300 via removable media such as diskette 342 and CD ROM 347. Diskette 342 inserts into diskette drive 341 which, in turn, connects to bus 330 via a controller 340. Similarly, CD ROM 347 inserts into CD ROM drive 346 which, in turn, connects to bus 330 via controller 345. Hard disk 342 is part of a fixed disk drive 341 that connects to bus 330 by controller 340.

User input to computer system 300 may be provided by a number of devices. For example, a keyboard 346 and mouse 347 connect to bus 330 via controller 344. In addition, other input devices, such as a pen, a tablet, or speech recognition mechanisms, may connect to bus 330 and an appropriate controller and software. A direct memory access (DMA) controller 360 performs direct memory access to RAM 310. User output may be generated by a video controller 364 that controls video display 370.

Computer system 300 also includes a communications adaptor 390 that allows the system to be interconnected to additional computing resources via a local area network (LAN) or a wide area network (WAN), such as the Internet, schematically illustrated by bus 391 and network 115. Signals traveling through network 115 can generally be referred to as "carrier waves" that transport information. Although aspects of the present invention are described as being stored in memory in the form of instructions, those aspects may be stored on other computer-readable media, such as secondary storage devices like hard disks, floppy disks, or CD ROM, or other forms of RAM or ROM, or a carrier wave.

Operation of computer system 300 is generally controlled and coordinated by operating system software. The operating system controls allocation of system resources and performs tasks, such as memory management, process scheduling, networking, and services, among other things.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for redirecting data in a network, the network connecting a first gateway and a second gateway, wherein the first gateway comprises a first node and a third node and the second gateway comprises a second node and a fourth node, the method comprising:
    receiving a first data to be transmitted over the network from a first workstation associated with the first gateway to a second workstation associated with the second gateway;
    configuring the first node of the first gateway and the fourth node of the second gateway to send and receive data encrypted with a security protocol via a first tunnel, the security protocol comprising:
        encrypting the address of the first workstation and the address of the second workstation, and
        securing the data so that only the address of the first gateway and the address of the second gateway is available to other users of the network;
    configuring the third node of the first gateway and the second node of the second gateway to send and receive data encrypted with the security protocol via a second configuring the first data to be transmitted between the third node of the first gateway and the second node of the second gateway via the second tunnel using the security protocol;
    detecting a failure of the third node of the first gateway;
    transmitting over the network an encrypted indication from the first node of the first gateway to the second node of the second gateway that the third node of the first gateway has failed;
    reconfiguring the first data to be transmitted over the network between the first node of the first gateway and the fourth node of the second gateway via the first tunnel using the security protocol after the encrypted indication has been received by the second node of the second gateway;
    transmitting the first data over the network between the first node of the first gateway and the fourth node of the second gateway via the first tunnel using the security protocol.

2. The method of claim 1, wherein the security protocol comprises at least one of Secured Socket Layer (SSL), Secure HTTP (SHTTP), Private Communications Technology (PCT), and IP Security (IPSEC).

3. The method of claim 1, wherein transmitting over the network the indication further comprising using Internet Key Exchange (IKE).

4. The method of claim 1, wherein the network comprises the Internet.

5. A system for redirecting data in a network, the system comprising:
    a first gateway associated with a first plurality of workstations, the first gateway comprising a first node and a third node;
    a second gateway associated with a second plurality of workstations, the second gateway comprising a second node and a fourth node,
        wherein the first node of the first gateway and the fourth node of the second gateway are configured to send and receive data encrypted with a security protocol via a first tunnel, the security protocol comprising:

encrypting the address of a first workstation among the first plurality of workstations and the address of a second workstation among the second plurality of workstations and securing the data so that only the address of the first gateway and the address of the second gateway is available to other users of the network; and wherein the third node of the first gateway and the second node of the second gateway are configured to send and receive data encrypted with the security protocol via a second tunnel;

at least one electronic processor that executes instructions comprising:

electronically executable instructions for receiving a first data to be transmitted over the network from the first workstation to the second workstation;

electronically executable instructions for configuring the first data to be transmitted between the third node of the first gateway and the second node of the second gateway via the second tunnel using the security protocol;

electronically executable instructions for detecting a failure of the third node of the first gateway;

electronically executable instructions for transmitting over the network an encrypted indication from the first node of the first gateway to the second node of the second gateway that the third node of the first gateway has failed; and electronically executable instructions for reconfiguring the first data to be transmitted over the network between the first node of the first gateway and the fourth node of the second gateway via the first tunnel using the security protocol after the encrypted indication has been received by the second node of the second gateway;

electronically executable instructions for transmitting the first data over the network between the first node in the first gateway and the fourth node in the second gateway via the first tunnel using the security protocol.

6. The system of claim 5, wherein the security protocol comprises at least one of Secured Socket Layer (SSL), Secure HTTP (SHTTP), Private Communications Technology (PCT), and IP Security (IPSEC).

7. The system of claim 5, wherein the instructions for transmitting over the network the indication include instructions for using Internet Key Exchange (IKE).

8. The system of claim 5, wherein the network comprises the Internet.

9. A computer-readable storage device on which is stored a set of instructions for redirecting data in a network, the network connecting a first gateway and a second gateway, wherein the first gateway comprises a first node and a third node and the second gateway comprises a second node and a fourth node, which when executed perform stages comprising:

receiving a first data to be transmitted over the network from a first workstation associated with the first gateway to a second workstation associated with the second gateway;

configuring the first node of the first gateway and the fourth node of the second gateway to send and receive data encrypted with a security protocol via a first tunnel, the security protocol comprising:

encrypting the address of the first workstation and the address of the second workstation, and securing the data so that only the address of the first gateway and the address of the second gateway is available to other users of the network;

configuring the third node of the first gateway and the second node of the second gateway to send and receive data encrypted with the security protocol via a second configuring the first data to be transmitted between the third node of the first gateway and the second node of the second gateway via the second tunnel using the security protocol;

detecting a failure of the third node of the first gateway;

transmitting over the network an encrypted indication from the first node of the first gateway to the second node of the second gateway that the third node of the first gateway has failed;

reconfiguring the first data to be transmitted over the network between the first node of the first gateway and the fourth node of the second gateway via the first tunnel using the security protocol after the encrypted indication has been received by the second node of the second gateway;

transmitting the first data over the network between the first node of the first gateway and the fourth node of the second gateway via the first tunnel using the security protocol.

10. The computer-readable storage device of claim 9, wherein the security protocol comprises at least one of Secured Socket Layer (SSL), Secure HTTP (SHTTP), Private Communications Technology (PCT), and IP Security (IPSEC).

11. The computer-readable storage device of claim 9, wherein transmitting over the network the indication further comprising using Internet Key Exchange (IKE).

12. The computer-readable storage device of claim 9, wherein the network comprises the Internet.

13. The method of claim 1, wherein the first data is prioritized based upon message type and network destination.

14. The system of claim 5, wherein the first data is prioritized based upon message type and network destination.

15. The computer-readable storage device of claim 9, wherein the first data is prioritized based upon message type and network destination.

* * * * *